Figure 1:
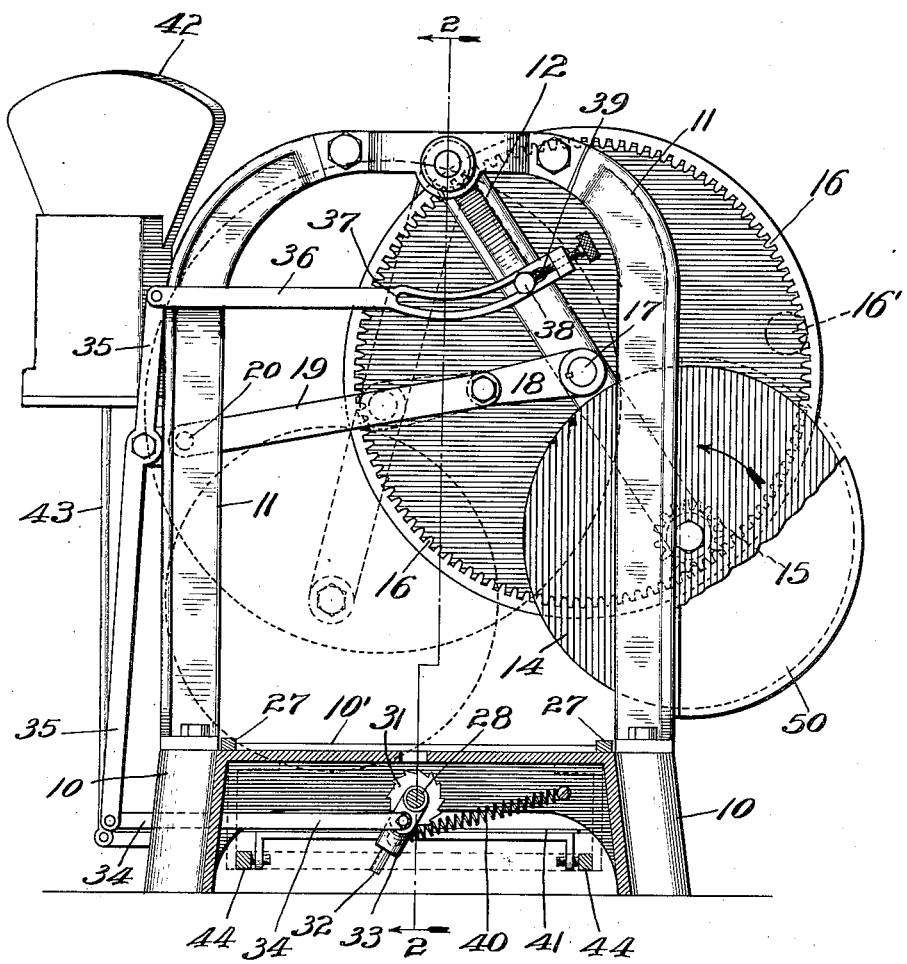

F. P. DUNN.
SLICER.
APPLICATION FILED MAY 7, 1907.

914,645.

Patented Mar. 9, 1909.
2 SHEETS—SHEET 1.

Witnesses
Frank A. Fahle
Thomas W. McMeans

Inventor
Frank P. Dunn
BY
Bradford Hood
Attorneys

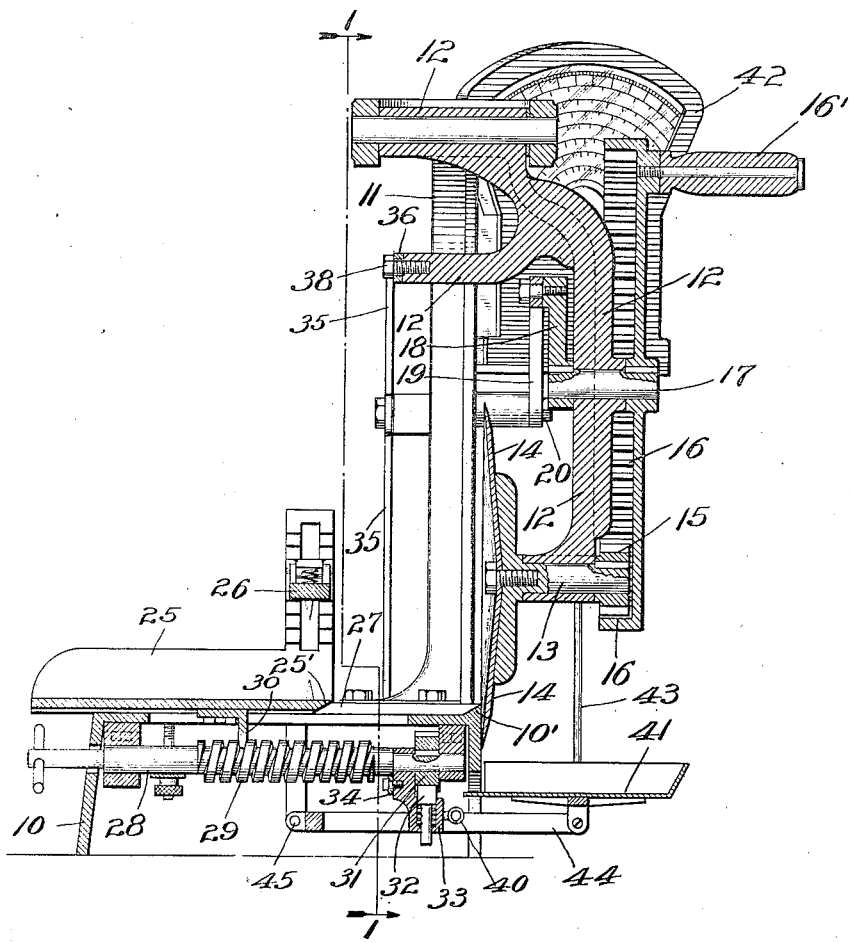
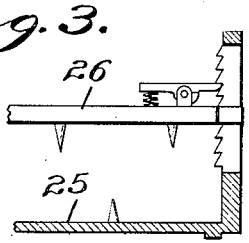

UNITED STATES PATENT OFFICE.

FRANK P. DUNN, OF ANDERSON, INDIANA, ASSIGNOR TO COPARTNERSHIP COMPOSED OF FRANK P. DUNN, JESSE L. VERMILLION, GEORGE P. LOUISO, AND HENRY F. DUNN, OF ANDERSON, INDIANA.

SLICER.

No. 914,645.      Specification of Letters Patent.      Patented March 9, 1909.

Application filed May 7, 1907. Serial No. 372,321.

*To all whom it may concern:*

Be it known that I, FRANK P. DUNN, a citizen of the United States, residing at Anderson, in the county of Madison and State of Indiana, have invented certain new and useful Improvements in Slicers, of which the following is a specification.

The object of my invention is to produce a simple, yet effective, mechanism for cutting material such as meat, bread, etc., into slices of desired and uniform thickness and for simultaneously weighing the sliced material as it falls from the slicer.

The accompanying drawings illustrate my invention.

Figure 1 is a vertical section on line 1—1 of Fig. 2; Fig. 2 is a vertical section on line 2—2 of Fig. 1, and Fig. 3 a detail of the clamp or holder.

In the drawings, 10 indicates a suitable base provided at one end with a substantially vertical bracket or standard 11 in the upper end of which is pivotally supported a depending cutter-carrying arm 12. Journaled in the lower end of arm 12 is a shaft 13 which carries a circular cutter disk 14 at its inner end. Secured to the outer end of shaft 13 is a pinion 15 which meshes with an internal gear 16. Gear 16 is preferably heavy enough to act as a fly-wheel and is carried by a shaft 17 journaled in the arm 12 at an intermediate point in its length. Cutter 14 coöperates with the adjacent end 10' of the base 10 and, in order to reciprocate the cutter across the width of the base, I secure, to the inner end of shaft 17, a crank 18 to the wrist pin of which is connected one end of a link 19. The opposite end of link 19 is pivotally connected at 20 to the upright 11, the arrangement being such that, as gear 16 is rotated to rotate cutter 14 at a high speed, crank 18 and link 19 will cause the arm 12 to swing from the position shown in full lines in Fig. 1 to the position shown in dotted lines in said figure, and return, thus causing the cutter disk 14 to reciprocate across the width of the base 10 while it is being rotated in the direction indicated by the arrow in Fig. 1.

Any suitable means may be provided to support the material to be cut, and for feeding the same automatically to the cutter. For this purpose I have shown in the accompanying drawings a sliding carrier 25 provided at its forward end with a vertically movable clamping jaw 26. Carrier 25 is movable toward and from the plane of the cutter 14 between suitable guides 27 formed on the base 10.

In order to automatically move the carrier 25 toward the plane of the cutter in uniform successive steps, I journal, in the base 10, a shaft 28 provided with a feed screw 29 adapted to receive a finger 30 secured to the under side of carrier 25. Secured to shaft 28 is a ratchet wheel 31 adapted to be engaged by a pawl 32 carried by a reciprocating arm 33 pivoted on shaft 28 and connected by a link 34 with the lower end of a lever 35. Lever 35 is pivoted upon the bracket 11 and its upper end is provided with a link 36 which has a slot 37 in its outer free end. Projecting through slot 37 is a pin 38 carried by arm 12 and, in order to vary the throw of the lever 35 and thus vary the amount of advancement of shaft 28, I provide arm 36 with an adjustable abutment 39 adapted to be engaged by the pin 38. Arm 33, and the parts connected therewith, are normally thrown back to one position by means of a light spring 40.

Arranged below the cutter 14 and the adjacent end of base 10, is a scale pan 41; said pan being arranged in position to receive the slices as they drop from the cutter. In the drawings I have shown a simple form of scale to register the weight of any material deposited in pan 41, said scale consisting of an ordinary spring balance or other scale 42, preferably of the computing type, the indicator arm of which is connected by a link 43 with the scale pan 41. The pan 41 may be conveniently partially supported upon the outer end of an arm 44 pivotally supported at 45 upon base 10.

A guard 50, shown partially in full lines and partially in dotted lines in Fig. 1, is attached to the upright 11 in order to guard the cutter 14 as it passes to and from the position shown in full lines in Fig. 1.

Gear 16 is provided with a crank-handle 16', which, when link 19 is arranged as shown, should preferably be arranged about 180 degrees from the crank 18 so that the horizontal component of the movement of the handle 16' is always in the same direction as the direction of the swing of arm 12, thus materially assisting in the ease of operation.

Carrier 25 is automatically fed toward the plane of the cutter a given amount for each reciprocation of the arm 12, this amount being easily varied by an adjustment of the abutment 39. When the carrier 25 has approached closely to the plane of the cutter, the carrier may be readily lifted from the bed 10 enough to withdraw finger 30 from the screw 29, whereupon the carrier may be moved back and the finger 30 again inserted into the screw 29 at a point farther away. The slices fall from the knife onto the scale pan and the total weight and value is instantly registered by the indicator of the scale 42, thus saving the necessity of transferring the slices to a distant scale and obviating the necessity of repeated trials to "get enough" to just fill the order.

In order to properly support the material carried by the carrier 25, the portion 10' of the frame 10 is raised to about the plane of the main plate of the carrier and the lower corner of the forward end of the carrier is correspondingly cut away as at 25'.

I claim as my invention:

1. In a slicer, the combination, with the main frame, of a swinging arm, a rotary knife carried by said arm, means wholly carried on said arm for rotating said knife, and means dependent upon the rotation of the knife for swinging said arm.

2. In a slicer, the combination, with a main frame, of a carrier mounted upon said frame and movable thereon, means for moving said carrier step by step on the main frame, a swinging arm, a rotary cutter carried by said arm to coöperate with the carrier, a driving gear journaled on the arm, a driving handle on said gear, a pinion meshing therewith and connected to the rotary cutter, a crank connected to the driving gear, a link connected at one end to the crank and at the other end to the main frame, and intermediate connections between the swinging arm and the carrier feeding means, for the purpose set forth.

3. In a slicer, the combination, with a main frame, a swinging arm mounted thereon, a rotary cutter carried by said arm, a driving member journaled on the arm, a handle carried by said driving member, intermediate driving connections between said driving member and the rotary knife for rotating the same, a crank connected with the driving member, and a restraining link connected with said crank, for the purpose set forth.

4. In a slicer, the combination, with a main frame, of a swinging arm mounted thereon, a rotary knife journaled on said arm, a pinion carried by said knife, a driving gear journaled on said arm and meshing with said pinion, means partaking of the swing of the arm by which said gear may be operated, a crank carried by said driving gear, and a restraining link connected with said crank.

5. In a slicer, the combination, with a main frame, of a swinging arm mounted thereon, a rotary knife journaled on said arm, a pinion carried by said knife, a driving gear journaled on said arm and meshing with said pinion, a crank carried by said driving gear, a restraining link connected with said crank and main frame, and a crank-handle mounted on said driving gear in such relation to the crank and its restraining means that one component of its rotative movement will be in the same direction as the resultant swinging movement of the swinging arm.

In witness whereof, I, have hereunto set my hand and seal at Anderson, Indiana, this 30th day of April, A. D. one thousand nine hundred and seven.

FRANK P. DUNN. [L. S.]

Witnesses:
GEORGE P. LOUISO,
J. K. ROBERTS.